US007200163B2

(12) United States Patent
Goodings

(10) Patent No.: US 7,200,163 B2
(45) Date of Patent: Apr. 3, 2007

(54) METHOD OF SPLITTING A SIGNAL AND SIGNAL PROCESSING CIRCUITRY AND APPARATUS UTILIZING THE SAME

(75) Inventor: Christopher J. Goodings, Fleet (GB)

(73) Assignee: NXP BV., Eindhoven (NL)

( * ) Notice: Subject to any disclaimer, the term of this patent is extended or adjusted under 35 U.S.C. 154(b) by 693 days.

(21) Appl. No.: 10/011,989

(22) Filed: Dec. 4, 2001

(65) Prior Publication Data

US 2002/0071481 A1 Jun. 13, 2002

(30) Foreign Application Priority Data

Dec. 7, 2000 (GB) .................................. 0029782

(51) Int. Cl.
*H04B 1/69* (2006.01)

(52) U.S. Cl. ...................... 375/148; 375/346; 375/144; 370/203; 370/302; 360/24; 204/269; 329/327

(58) Field of Classification Search ................ 375/136, 375/144, 148, 150, 316, 325, 346, 350; 360/24; 704/269; 329/327; 370/203, 302
See application file for complete search history.

(56) References Cited

U.S. PATENT DOCUMENTS

| | | | | |
|---|---|---|---|---|
| 3,988,679 | A | 10/1976 | Clarke et al. | 325/377 |
| 4,363,138 | A * | 12/1982 | Franklin et al. | 455/226.2 |
| 5,872,815 | A * | 2/1999 | Strolle et al. | 375/321 |
| 6,219,376 | B1 * | 4/2001 | Zhodzishsky et al. | 375/148 |
| 6,778,594 | B1 * | 8/2004 | Liu | 375/222 |

* cited by examiner

*Primary Examiner*—Temesghen Ghebretinsae
*Assistant Examiner*—Juan Alberto Torres

(57) ABSTRACT

A method of splitting a signal (10) into two parts (10", 10') is disclosed together with signal processing circuitry (22) for the same. The method comprises the steps of derotating the signal (10) whereby the frequency band of the derotated signal overlaps zero frequency; and splitting the derotated signal into two parts, a first signal part (10") consisting substantially of positive frequency signal components and a second signal part (10') consisting substantially of negative frequency signal components. Also disclosed is methods, incorporating such a method of splitting a signal, for identifying the presence of in-band interference (11) in a signal and for despreading a spread spectrum signal.

17 Claims, 3 Drawing Sheets

METHOD OF SPLITTING A SIGNAL AND SIGNAL PROCESSING CIRCUITRY AND APPARATUS UTILIZING THE SAME

FIELD OF THE INVENTION

This invention relates to a method of splitting a signal into two parts and to signal processing circuitry for the same. The invention further relates to methods, incorporating said method of splitting a signal, for identifying the presence of in-band interference in a signal and for despreading a spread spectrum signal.

BACKGROUND OF THE INVENTION

In many applications, it is desirable to split a signal into two or more parts and by way of example, two such applications will be described.

A first example is disclosed in U.S. Pat. No. 3,988,379 Clarke et al. and relates to a wideband receiving system able to eliminate in-band interference from a received wideband signal. The wideband receiving system has a multichannel filter arrangement comprising a broadband power splitter for splitting a received broadband signal into several subchannels and a series of narrowband bandpass filters, each associated with a different subchannel, for providing frequency delimited portions of the received signal in the subchannels. Means for detecting the presence of interference within each subchannel is also provided wherein subchannel(s) containing interference are disabled. The remaining subchannels are then recombined, providing a signal corresponding to the received signal with those portions of the received signal containing interference removed.

A second example is disclosed in U.S. Pat. No. 4,363,138 Franklin et al., also in which it is known to split a received spread spectrum signal in two subchannels and using bandpass filters, provide two different frequency delimited portions of the received signal which can be compared to each to other in order to despread the signal in a noisy environment.

Both U.S. Pat. Nos. 3,988,379 and 4,363,138 are however, a disadvantage of such conventional arrangements of splitting a signal is the degree of complexity of the filter arrangements necessary in order to provide sharply defined subchannels, especially when implemented with analogue filter circuitry.

OBJECT OF THE INVENTION

It is therefore an object of the present invention to provide an alternative, uncomplicated method of splitting a signal into two parts and apparatus for the same. It is a further object of the invention to use such a method for the purpose of identifying the presence of in-band interference in a signal and also for despreading a spread spectrum signal.

SUMMARY OF THE INVENTION

According to a first aspect of the present invention, there is provided a method of splitting a subject signal and signal processing circuitry for the same, the method comprising the steps of derotating the signal whereby the frequency band of the derotated signal overlaps zero frequency, ideally symmetrically, and splitting the derotated signal into two parts, a first signal part consisting substantially of positive frequency signal components and a second signal part consisting substantially of negative frequency signal components.

Such a method is relatively simple and may be readily implemented using basic filtering circuitry. For example, splitting the derotated signal into two parts may accomplished using known analogue polyphase filters which can readily achieve 30 dB rejection of the opposing negative or positive frequencies.

In order to removes the presence of any interference transposed to zero frequency during derotation, the method may further comprise the step of filtering the derotated signal whereby components of the derotated signal around zero frequency are removed, for example, by using a notch filter.

According to a second aspect of the present invention, there is provided a method of identifying narrow in-band interference in a signal and signal processing circuitry for the same, the method comprising the steps of splitting the subject signal by a method according to the first aspect of the present invention to obtain first and second signal parts; and comparing the first and second signal parts in order to identify the presence of in-band interference.

Once signal interference is identified, it may be compensated for or, alternatively, the part of the signal containing the interference may be discarded.

According to a third aspect of the present invention, there is provided a method of despreading a spread spectrum signal containing target pseudorandom noise (PRN) code sequences comprising the steps of splitting the spread spectrum subject signal by a method according to the first aspect of the present invention to obtain first and second signal parts; generating replica code signals corresponding to the target code; and correlating the first and second signal parts with the replica code signals and returning respective correlation values for determining if the target code has been acquired.

Also provided in accordance with the third aspect of the present invention is a spread spectrum signal receiver comprising signal processing circuitry according to the first aspect of the present invention for of splitting a spread spectrum signal into first and second signal parts, a generator for generating a series of signals containing replica codes corresponding to the target code, a correlator for correlating each signal part with the replica code signals and returning respective correlation values for determining if the target code has been acquired.

BRIEF DESCRIPTION OF THE DRAWINGS

The above and other features and advantages of the present invention will be apparent from the following description, by way of example, of an embodiment of a method of splitting a signal and a GPS receiver according to the present invention with reference to the accompanying drawings in which.

DETAILED DESCRIPTION

Figure 1A:
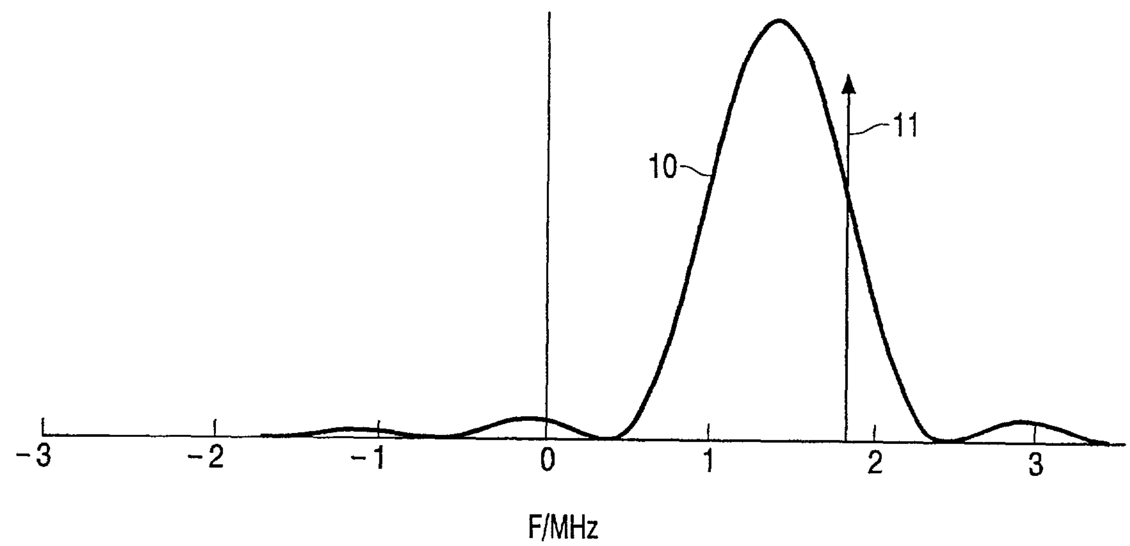
FIGS. 1A to 1D illustrate the splitting of a signal by a method according to the first aspect of the present invention.

FIGS. 1A to 1D show, schematically, a subject signal split by a method according to the first aspect of the present invention. As shown in FIG. 1A, curve 10 represents a broadband subject signal having a frequency band of about 1.3 MHz and containing in-band interference from a narrowband interference signal 11 of frequency 1.8 MHz.

Figure 1B:
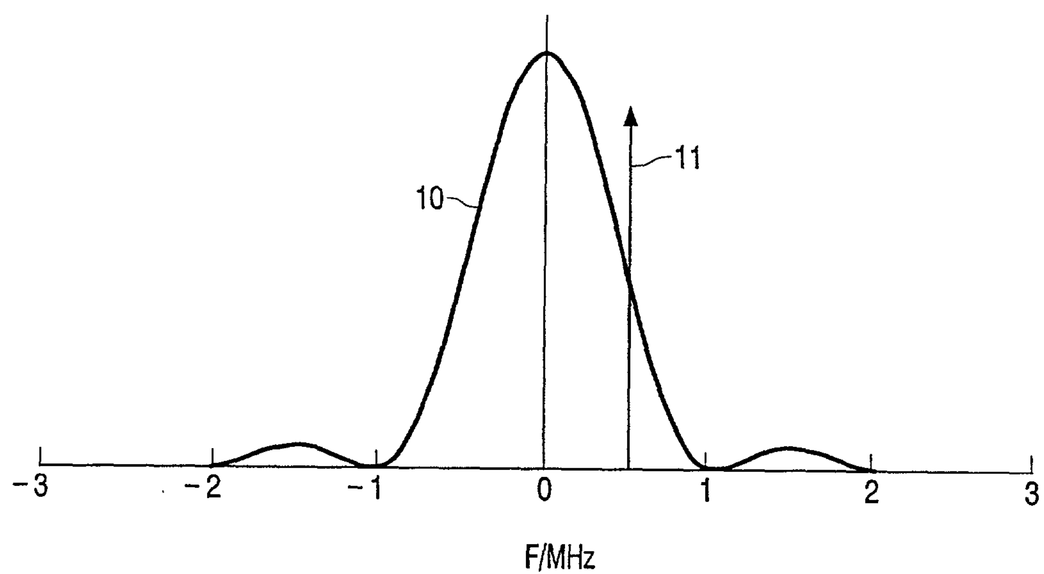
Figure 1C:
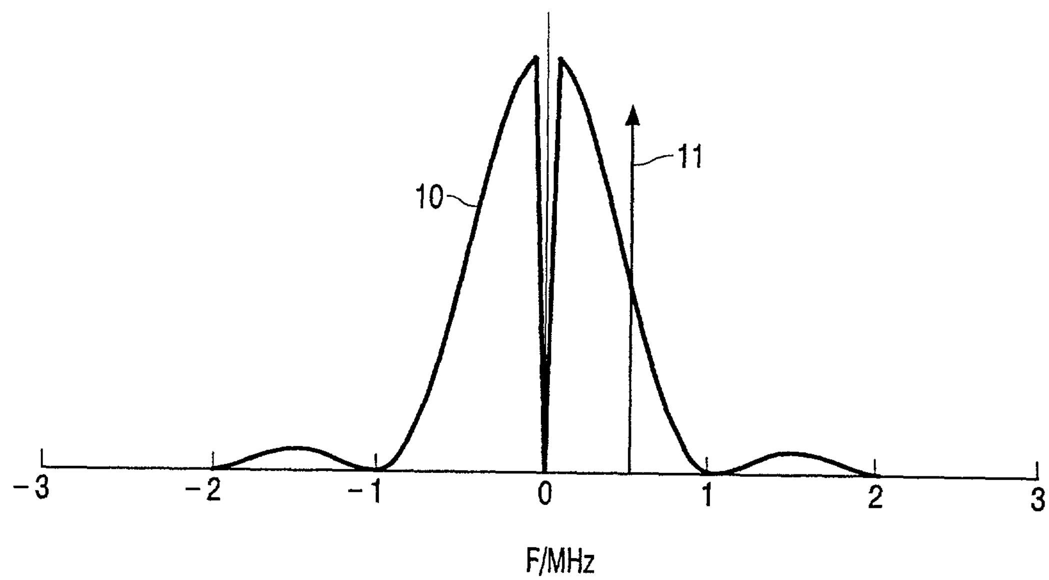
Figure 1D:
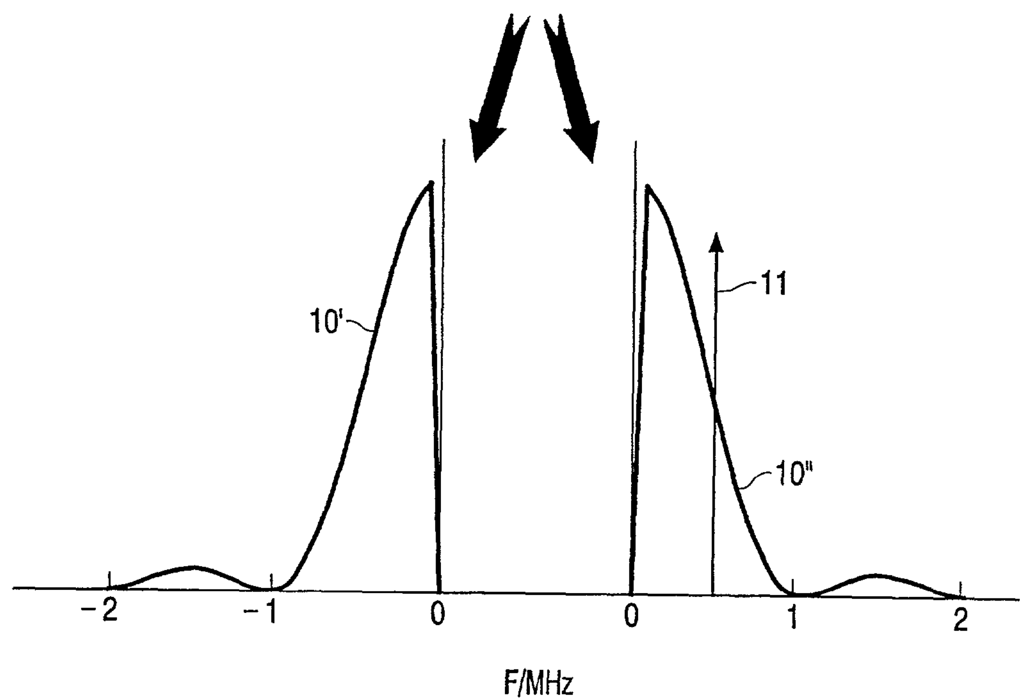

In FIG. 1B, the subject signal 10 is derotated whereby the frequency band of the subject signal is transposed, symmetrically about zero frequency. The interference signal 11 is transposed to +0.5 MHz. Then, as shown in FIG. 1C, a notch filter is applied to the derotated subject signal at zero frequency to remove any interference transposed to zero frequency during derotation. In FIG. 1D, the resultant signal is split about zero frequency into separate negative and positive frequency signal parts 10', 10". As a consequence, only the positive frequency signal part 10" contains any interference.

Figure 2:
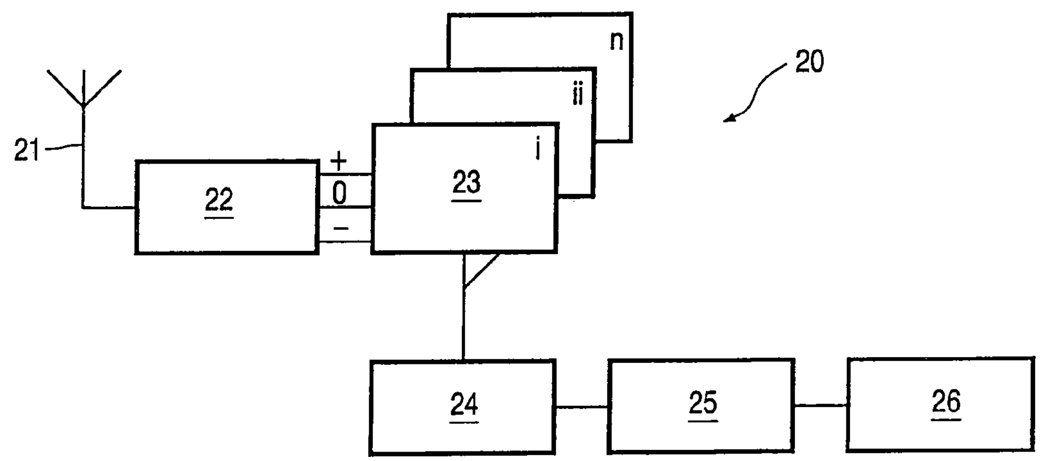
FIG. 2 shows, schematically, a global positioning systems (GPS) receiver comprising signal processing circuitry for implementing the method of splitting a signal illustrated in FIGS. 1A to 1D, a method of identifying in-band interference in accordance with the second aspect of the present invention and a method of despreading the GPS signal in accordance with the third aspect of the present invention.

In FIG. 2, a GPS receiver 20 according to the present invention is shown comprising an antenna 21, a signal pre-processor 22, n digital receiver channels 23, a receiver processor 24, a navigation processor 25 and a display 26. In use, standard positioning service (SPS) GPS satellite signals are received by an antenna 21, pre-processed in a pre-processor 22 and then fed in to each of the digital receiver channels 23 for despreading of the GPS signals in co-operation with a receiver processor. Once acquired, the GPS signals may be tracked for the purpose of deriving pseudo-range information from which the location of the mobile telephone can be determined using conventional navigation algorithms. Such methods for GPS signal acquisition, tracking and position determination are well known, for example, GPS Principles and Applications (Editor, Kaplan) ISBN 0-89006-793-7 Artech House.

Figure 3:
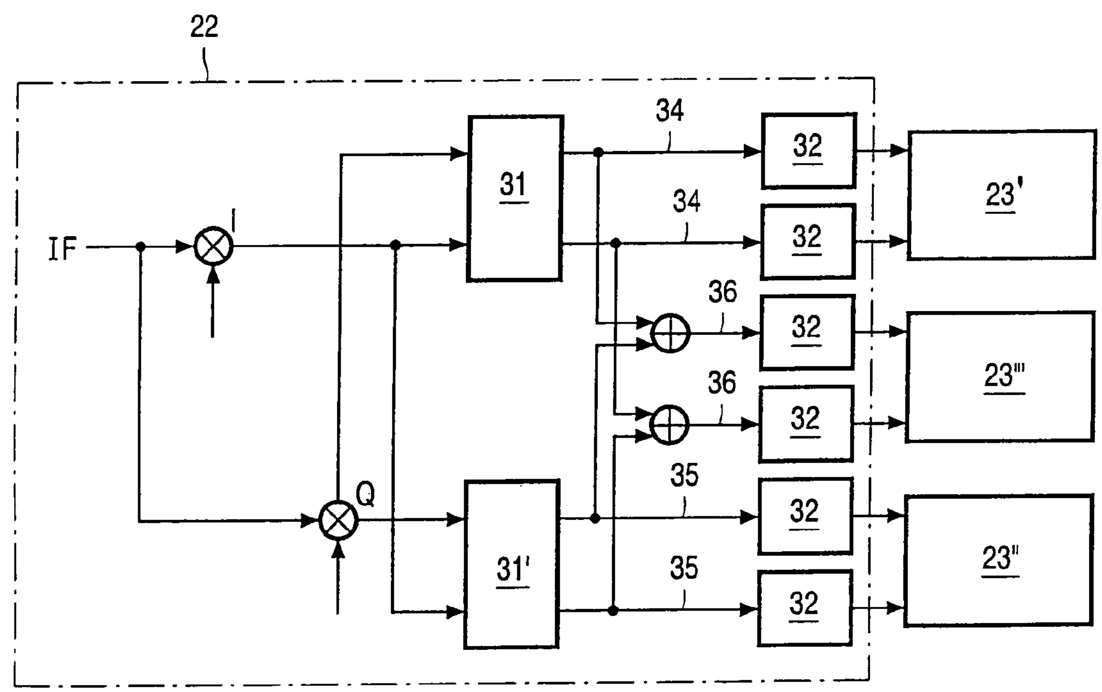
FIG. 3 shows, schematically, the interaction of the preprocessor and the receiver channels of the GPS receiver of FIG. 2 in greater detail.

Referring to FIG. 3, the interaction of the pre-processor 22 and the receiver channels 23 of the GPS receiver of FIG. 2 is shown in greater detail. Although not shown, for initial pre-processing, the pre-processor comprises an amplifier for preamplification, an downconverter for down converting the received signals to an zero intermediate frequency (IF). I and Q components of the derotated IF signal are then fed into a pair of analogue polyphase filters 31, 31' where they are split in to positive frequency 34 and negative frequency 35 subchannels in accordance with the method illustrated in FIGS. 1A to 1D. Each subchannel is sampled in an analogue to digital converter 32 and fed into respective zero IF receiver channels 23', 23" in which they compared to early (E), prompt (P) and late (L) replica codes of the GPS PRN sequences in order to acquire the received GPS signals. An additional receiver channel 23'" is used to correlated signals 36 recombined from positive and negative frequencies subchannels 34, 35.

The presence of in-band interference in a signal can be identified by comparing the correlation results from the positive frequency and negative frequency subchannels. In the event of large discrepancies, the results from the subchannel indicative of the least amount of correlation may be discarded.

The dynamic range of typical GPS front end circuitry is of the order of 60 dB whereas the dynamic range of a NAVSTAR GPS signal is around 15 dB and the CW jamming immunity of a standard GPS receiver only around 15 dB. It would therefore appear likely, given that up to 30 dB of rejection of the negative or positive frequencies can be achieved using an analogue polyphase filter, that a full 30 dB of jamming improvement could be realized. Splitting a signal, however, may lead to a potential loss in coherence between the signal parts resulting in an overall loss of up to 3 dB in the correlation from the signal parts compared to the correlation that would be achieved from the full signal, in a signal. As such, a method according to the third aspect of the present invention would work best with relatively strong GPS signals.

In the GPS receiver of the type shown schematically in FIG. 2, the pre-processing would typically be implemented in the form of front end analogue circuitry with the subsequent digital processing done using either a general purpose microprocessor or a microprocessor embedded within a GPS application specific integrated circuit. Implementation of methods according to the first, second and third aspects of the present invention, including the example described above, would be accomplished by appropriate analogue circuitry design and/or microprocessor programming. Of course, such design and programming is well known and would be accomplished by one of ordinary skill in the art of GPS and CDMA communication without undue burden.

Also, at present GPS is most notably associated with the Navigation System with Time and Ranging (NAVSTAR) GPS, an all weather, spaced based navigation system developed and operated by the US Department of Defense, however, the general principles underlying GPS are universal and not merely limited to NAVSTAR. Accordingly, GPS hereafter refers to any global positioning system comprising a plurality of radio transmitters at different locations and a receiver which determines its location based on the time of arrival of the transmissions of the radio transmitters. Furthermore, whilst the third aspect of the present invention is of particular benefit to the field of GPS, such reference should not be interpreted as limiting the scope of the invention to merely GPS. For example, this aspect of the invention is equally applicable to CDMA communication between mobile cellular telephones and associated networks.

From a reading of the present disclosure, other modifications will be apparent to the skilled person skilled and may involve other features which are already known in the design, manufacture and use of GPS and other spread spectrum signal receivers and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly, whether or not it relates to the same invention as presently claimed in any claim and whether or not it mitigates any or all of the same problems as does the present invention. The applicants hereby give notice that new claims may be formulated to such features and/or combinations of such features during the prosecution of the present application or of any further application derived therefrom.

The invention claimed is:

1. A method to detect interference in a subject signal that resides within a first frequency band, said method comprising:

derotating the subject signal such that the derotated subject signal resides within a second frequency band, said second frequency band overlapping zero frequency;

splitting the derotated subject signal into two parts, a first signal part comprising positive frequency signal components and a second signal part comprising negative frequency signal components; and using both parts in making at least one comparison to detect said interference.

2. A method according to claim 1 wherein the subject signal is derotated so as to symmetrically overlap the zero frequency.

3. A method of despreading a spread spectrum subject signal containing target pseudorandom noise (PRN) code sequences comprising the steps of splitting the spread spectrum subject signal by a method according to claim 1 to obtain first and second signal parts; generating replica code signals corresponding to the target code; and correlating the first and second signal parts with the replica code signals and returning respective correlation values for determining whether the target code has been acquired.

4. The method of claim 1, further comprising filtering the derotated to signal to remove components of the derotated signal.

5. A method to overcome an effect of interference on a subject signal that resides within a first frequency band, said method comprising:

derotating the subject signal such that the derotated subject signal resides within a second frequency band, said second frequency band overlapping zero frequency;

splitting the derotated subject signal into two parts, a first signal part comprising positive frequency signal components and a second signal part comprising negative frequency signal components; and filtering the derotated subject signal, with a notch filter, so as to remove components of the derotated subject signal around zero frequency.

6. A method of identifying narrow in-band interference in a subject signal comprising the steps of:

derotating the subject signal whereby the frequency band of the derotated subject signal overlaps zero frequency;

splitting the derotated subject signal into two parts, a first signal part comprising positive frequency signal components and a second signal part comprising negative frequency signal components; and comparing the first and second signal parts in order to identify the presence of in-band interference.

7. A Signal processing circuitry for detecting interference in a subject signal having a known frequency band, comprising: a pre-processor configured for derotating the subject signal by transposing the frequency band of the subject signal so that the frequency band of the derotated subject signal overlaps zero frequency, and splitting, for one or more subsequent comparisons the derotated subject signal into two parts, a first signal part comprising positive frequency signal components and a second signal part comprising negative frequency signal components; and a comparison module for making said one or more subsequent comparisons on said first signal part and said second signal part for detecting interference in said subject signal.

8. Signal processing circuitry according to claim 7 arranged to derotate a subject signal to overlap zero frequency substantially symmetrically.

9. Signal processing circuitry according to claim 7 comprising at least one polyphase filter.

10. Signal processing circuitry according to claim 7 further comprising a filter adapted to remove components of the derotated subject signal around zero frequency.

11. Signal processing circuitry according to claim 7 arranged to compare the first and second signal parts in order to identify the presence of in-band interference.

12. A spread spectrum signal receiver comprising signal processing circuitry according to claim 7 for splitting a spread spectrum signal into first and second signs parts, a generator for generating a series of signals containing replica codes corresponding to the target code, a correlator for correlating each signal part with the replica code signals and returning respective correlation values for determining whether the target code has been acquired.

13. The signal processing circuitry of claim 9, wherein a given one from among said at least one polyphase filter outputs subchannels of positive frequency only.

14. The signal processing circuitry of claim 13, wherein said given one from among said at least one polyphase filter has two inputs, one being an in-phase component signal, the other being a quadrature component signal.

15. The signal processing circuitry of claim 14, wherein the comparison module comprises a further receiver channel configured for correlating signals recombined, the recombination joining a signal from among the positive frequency subchannels with a signal from among the negative frequency subchannels.

16. The signal processing circuitry of claim 15, wherein said at least one polyphase filter amounts to two polyphase filters, the other one of said polyphase filters outputting subchannels of negative frequency only.

17. The signal processing circuitry of claim 13, wherein said at least one polyphase filter amounts to two polyphase filters, the other one of said polyphase filters outputting subchannels of negative frequency only.

* * * * *